(12) United States Patent
Raffalt et al.

(10) Patent No.: US 6,259,259 B1
(45) Date of Patent: Jul. 10, 2001

(54) METHOD AND APPARATUS FOR AUTOMATICALLY ADJUSTING THE MEASUREMENT RANGE OF ADMITTANCE LEVEL SENSORS

(75) Inventors: Felix Raffalt, Hausach; Siegbert Woehrle, Schiltach, both of (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 09/295,708

(22) Filed: Apr. 21, 1999

(30) Foreign Application Priority Data

Apr. 21, 1998 (DE) ............................................... 198 17 722

(51) Int. Cl.$^7$ ............................. G01R 27/28; G01R 19/18
(52) U.S. Cl. ........................................... 324/650; 324/118
(58) Field of Search ..................................... 324/650, 658, 324/660, 76.66, 117 R, 610, 118

(56) References Cited

U.S. PATENT DOCUMENTS 4,242,631    12/1980    Hall ....................................... 324/649

FOREIGN PATENT DOCUMENTS

4235243C2    4/1994    (DE).
4244739C2    4/1994    (DE).

*Primary Examiner*—Safet Metjahic
*Assistant Examiner*—J. Kerveros
(74) *Attorney, Agent, or Firm*—Ropes & Gray

(57) ABSTRACT

A method for rectifying a sensor current with a synchronous demodulator, wherein the rectifying factor of the synchronous demodulator can be controlled. A control clock pulse signal of the synchronous demodulator is toggled between at least two different states, with the states corresponding to different rectifying factors. The resulting total rectifying factor of the synchronous demodulator can be selected at will by adjusting the pulse duty factor between the at least two states.

19 Claims, 2 Drawing Sheets

METHOD AND APPARATUS FOR AUTOMATICALLY ADJUSTING THE MEASUREMENT RANGE OF ADMITTANCE LEVEL SENSORS

BACKGROUND OF THE INVENTION

1. Field of the Invention

This application relates to the field of measuring a variable admittance and more particularly to the field of measuring a level in vessels with a capacitance sensor.

2. Description of Related Art

Capacitive level sensors employed in practice have a length of between several centimeters and approximately 30 meters. The dielectric constant of the products to be measured varies between approximately 1.5 and 100, and the products may also be electrically conducting. This produces a difference in the capacitance between a covered portion of the sensor and an uncovered portion of the sensor of between approximately 6 pF and 3,000 pF. The capacitance and admittance measurement apparatus which processes the sensor results are therefore preferably adjustable over a variable capacitance range (Turn-Down) of approximately 1:500.

Conventional devices use a combination of two different arrangements. According to one arrangement, the measurement result is amplified with a variable amplification and/or expanded (either using analogue amplifier stages or digitally using a microprocessor). According to another arrangement, the capacitance measurement range of the admittance measuring device is switched.

German patent DE 42 35 243 C1 by the Applicant discloses a method for switching the capacitance measurement range. The supply voltage of the sensor and thereby the sensitivity of the capacitance measurement is herein adjusted, for example, with a ratio of 1:5:25 by a three-stage switch which can be used to connect the sensor to three different winding tabs of the oscillator transmitter.

This conventional approach is disadvantageous in that the switching device is part of an extrinsic circuit operating at a different potential. Moreover, a bipolar high frequency alternating current has to be switched, wherein the turn-on resistance of the circuit element should be kept below 1 ohm to eliminate phase shifts in the measurement circuit. The self-capacitance of the switching element should also be less than a few pF to minimize adverse effects on the measured value.

As a result, a mechanical switch should be used as a switching element. This conventional approach does not enable microprocessor-controlled electronic switching of the capacitance measurement range.

It is therefore desirable to improve the conventional method for switching the measurement range of admittance level sensors so as to enable automatic electronic switching of the measurement range, while at least maintaining the switching ratio attainable with a mechanical switch. It is also desirable to provide an apparatus for automatically switching the measurement range.

SUMMARY OF THE INVENTION

In general, according to one aspect of the invention, a synchronous demodulator is employed for rectifying a sensor current, wherein a rectifying factor of the synchronous demodulator can be controlled by alternately switching a timing or clock pulse signal between at least two different states. Each of the two states corresponds to a different rectifying factor. The resulting total rectifying factor of the demodulator can be freely selected via the pulse duty cycle between the two states.

The invention thus advantageously provides electronic switching of the measurement range which is increasingly common with intelligent smart transmitters employed in industrial level measurement applications.

The method and the apparatus of an intelligent admittance level sensor according to the invention provides the following advantages to the user:

automatically selecting a suitable measurement range when the sensor is set up in the vessel, thereby preventing users from entering erroneous set points;

eliminating the possibility of having to refill the container for calibration purposes because the measurement range was erroneously preselected;

enabling remotely setting the level transmitter through a hand-held terminal which can be clamped to the sensor line at any desired location, to remotely set all parameters of the sensors using an appropriate communication protocol (e.g., HART);

providing pressure-resistant, encapsulated sensor housings which may no longer be opened during the sensor operation for adjusting the settings; and providing the sensor with a field bus system (e.g. Profibus) to connect different sensors in a digital network with a process control located in a central control center via a common bus, wherein all sensor settings can be adjusted by the control center via the bus system.

Further features and advantages of the present invention will be apparent from the following description of preferred embodiments and from the claims.

DETAILED DESCRIPTION OF PREFERRED EMBODIMENTS

Figure 1:
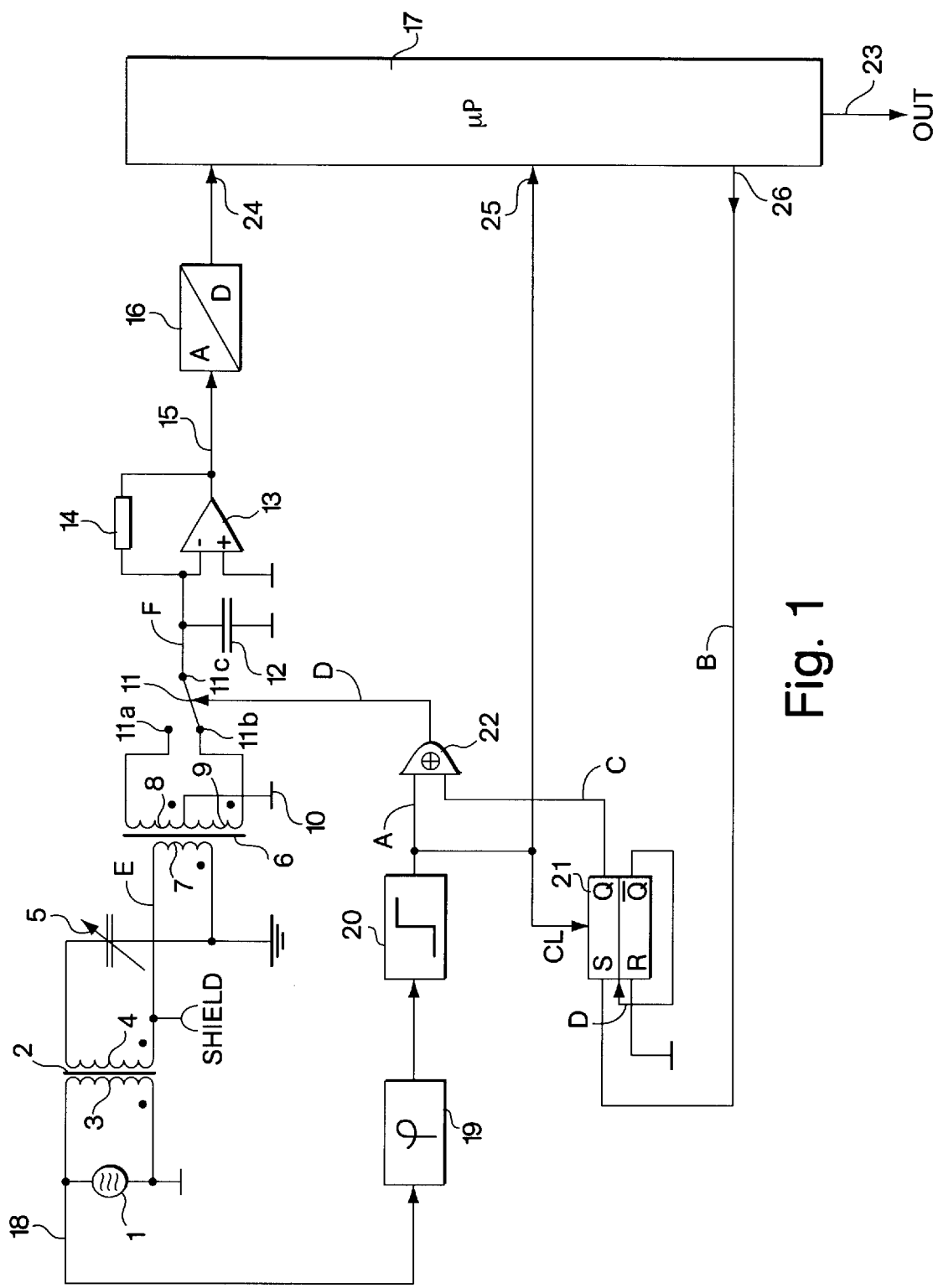
FIG. 1 is a circuit operating according to the method of the invention.

Referring now to FIG. 1, a system according to the invention for phase selectively processing admittance data is particularly suited for capacitive level sensors, but may also be used for admittance measurements in other applications.

The system shown in FIG. 1 includes an oscillator 1, in the present example a high-frequency sine wave oscillator with an output frequency of, for example, 300 kHz, which is connected in parallel with a primary winding 3 of an isolation transformer 2. One of the terminals is connected to a reference potential, with an oscillator voltage 18 supplied at the second oscillator terminal.

The isolation transformer 2 which operates as a voltage converter, includes a secondary winding 4, with one terminal of the secondary winding 4 connected to a shield and to a terminal of a primary winding 7 of a transformer 6 operating as a current converter. The other terminal of the secondary winding 4 of the isolation transformer 2 is connected to a terminal of the measurement sensor 5. The other terminal of the measurement sensor 5 is connected to both ground potential and to the second terminal of the primary winding of the transformer 7.

A current which is proportional to the admittance of the sensor, flows in a circuit formed by the secondary winding 4, the measurement capacitance of the measurement/level sensor 5, and the primary winding 7 of the transformer 6. The transformer 6 supplies this current phase-locked to the two secondary windings 8 and 9 of the transformer 6. The two secondary windings 8 and 9 produce two signals which are phase shifted relative to each other by 180°, as referenced to a center tab 10 of the secondary windings of the transformer 6 which is connected to zero volt potential.

The external tabs of the two secondary windings 8 and 9 are connected to contacts 11a and 11b of a switch operating as a synchronous demodulator 11, wherein the switch is periodically switched between the two terminals 11a, 11b synchronously with a switching signal D applied to the switch. The output contact of the switch 11 is indicated with the reference numeral 11c and connected to the inverting input of an operational amplifier 13 and to a terminal of a blocking capacitor 12. The other terminal of the blocking capacitor 12 and the non-inverting input of the operational amplifier 13 are connected to ground. A resistor 14 is connected to a feedback loop between the inverting input of the operational amplifier 13 and the output of the operational amplifier 13. An analog voltage which is proportional to the sensor admittance, is supplied at the output of the operational amplifier 13. This output voltage can be digitized in an analog-to-digital converter 16 and subsequently supplied to an input terminal 24 of a microprocessor 17.

The switch of the synchronous demodulator 11 is formed as an electronic switch. The operational amplifier 13 operates as a current-to-voltage converter. Since the positive input of the operational amplifier 13 is referenced to zero volts, all voltage changes occurring at the synchronous demodulator 11 and the transformer 6, respectively, are compensated through the compensation current flowing through the resistor 14. As a result, no high frequency voltage is present at the transformer 6 or at the electronic switch of the synchronous demodulator 11. The transformer 6 therefore operates as a pure current converter, so that neither the self-capacitance nor inductance of the transformer 6 nor the capacitance of the electronic switch of the synchronous demodulator 11 influence the measurement result. Because the synchronous demodulator 11 is controlled by the phase shifted signal D derived from the oscillator 1, an alternating current is produced at the output of the switch 11, wherein the the arithmetic mean of the alternating current forms a DC signal which corresponds to the desired measurement value. The blocking capacitor 12 shorts the superimposed AC component, so that the converter 13 connected to the output of the switch 11 can be implemented as a simple DC current converter.

The switching signal D is produced by supplying the output voltage of the oscillator 1 to a phase shifter 19 connected in series either before or after a sine wave to square wave converter 20. An intermediate signal A is produced at the output of the phase shifter 19 and square wave converter 20 connected in series and supplied to a first input of an XOR gate 22. The intermediate signal A is also provided to the clock input CL of a flip flop 21 and to the input terminal 25 of the microprocessor 17.

The second input of the XOR gate 22 is connected to the Q output of the flip flop 21. The output of the XOR gate supplies a switching signal D and is therefore connected to the control input of the synchronous demodulator 11.

The flip flop 21 includes an S input which is connected to the output terminal 26 of the microprocessor 17. The R input of the flip flop 21 is connected to zero potential. The inverting Q output of the flip flop 21 is connected to the D input of the flip flop 21.

Lastly, the microprocessor 17 includes an output terminal 23 supplying the measurement signal OUT.

The circuit of FIG. 1 operates as follows:

The oscillator 1 which oscillates, for example, at a frequency of 300 kHz, supplies the primary winding 3 of the isolation transformer 2. The secondary winding 4 of the isolation transformer 2 produces an output voltage which has a different potential and supplies the sensor 5. The two secondary windings 8, 9 of the current converter 6 produce two currents which are phase-shifted relative to each other by 180°. The phase-shifted currents are supplied to the synchronous demodulator 11. The synchronous demodulator 11 provides the output current F according to the clock pulse D. The output current F is smoothed by the capacitor 12 and converted to the voltage 15 by the operational amplifier 13. The slope of the current-to-voltage conversion is determined by the resistor 14.

At a constant oscillator voltage 18, the output voltage 15 is directly proportional to the capacitance of the measurement sensor 5. The current converter 6 is operated in a virtual circuit due to the zero-ohm input impedance of the current-to-voltage converter formed by the operational amplifier 13 and the resistor 14 and therefore does not produce a voltage.

The clock pulses D are produced by phase shifting the oscillator voltage 18 with the phase shifter 19 according to the requirements of the admittance measurement. The square wave generator 20 then forms the binary intermediate signal A which passes through the XOR gate 22 to provide the clock pulses D for the demodulator 11.

For sake of clarity, control circuits for controlling the voltage amplitude of oscillator 1, of the phase of signal A and for the pulse ratio of signal A are omitted from the drawing. These control circuits may be implemented in a manner similar to that disclosed in the German patent DE 42 44 739 C2, which is incorporated herein in its entirety by reference. Likewise, the circuit may have, in addition to the input for the sensor capacitance 5, another subtracting input for a compensating capacitance. This feature is also shown in detail in DE 42 44 739 C2.

The voltage signal 15 which is proportional to the sensor capacitance, is digitized by the analog-to-digital converter 16 and is supplied to the input terminal 24 of the microprocessor 17. The microprocessor 17 processes the signal by performing corresponding computing operations, such as integration, scaling, linearization, and the like, and outputs the signal at the output terminal 23 to control, for example, a 4 . . . 20 mA current output stage and/or a field bus interface.

The microprocessor 17 may also be used to set the most advantageous measurement range of the admittance measurement circuit. The rectifying factor of the synchronous demodulator 11 is set so that the analog-to-digital converter 16 is modulated over the widest possible range, without saturating at a fill level of 100%. Based on the capacitance value at the 100% fill level, the optimum measurement range for the subsequent measurement operation is selected by the microprocessor 17 at the same time when the empty/full calibration is performed. For this purpose, the microprocessor 17 provides at the output terminal 26 the signal B for adjusting the rectifying factor.

The largest rectifying factor is obtained when the clock rate of the switching signal D has the same frequency as the oscillator 1 and the signal A, respectively. A rectifying factor of zero is obtained, for example, when the frequency of the switching signal D is half the frequency of the signal A. The aforementioned half frequency is generated by the flip flop 21 operating as a frequency divider. If the set input (S input) is not active, then the signal C having half the frequency of A is obtained at the Q output of the flip flop 21. The link between the fundamental frequency A and the half frequency C via the XOR gate 22 supplies at the output of the OR gate 22 the switching signal D which also has half the frequency of A.

The set input (S input) of the flip flop 21 is activated when the signal B supplied by the processor 17 transitions from low to high, so that the output signal C of the flip flop 21 is continuously high. The link between the signals C and A then provides at the output of the XOR gate 22 a frequency which is identical to the frequency of signal A.

The clock signal D can therefore be switched between the fundamental frequency and half the frequency with the help of the logic level of signal B. If the signal B is set to high, then the rectifying factor is 100%; if the signal B is set to low, then the rectifying factor is 0%. An arbitrary rectifying factor between 0% 100%, representing the mean value, can be set by cycling between the two rectifying factors and outputting the signal B of the microprocessor 17 with a corresponding pulse duty cycle.

Figure 2:
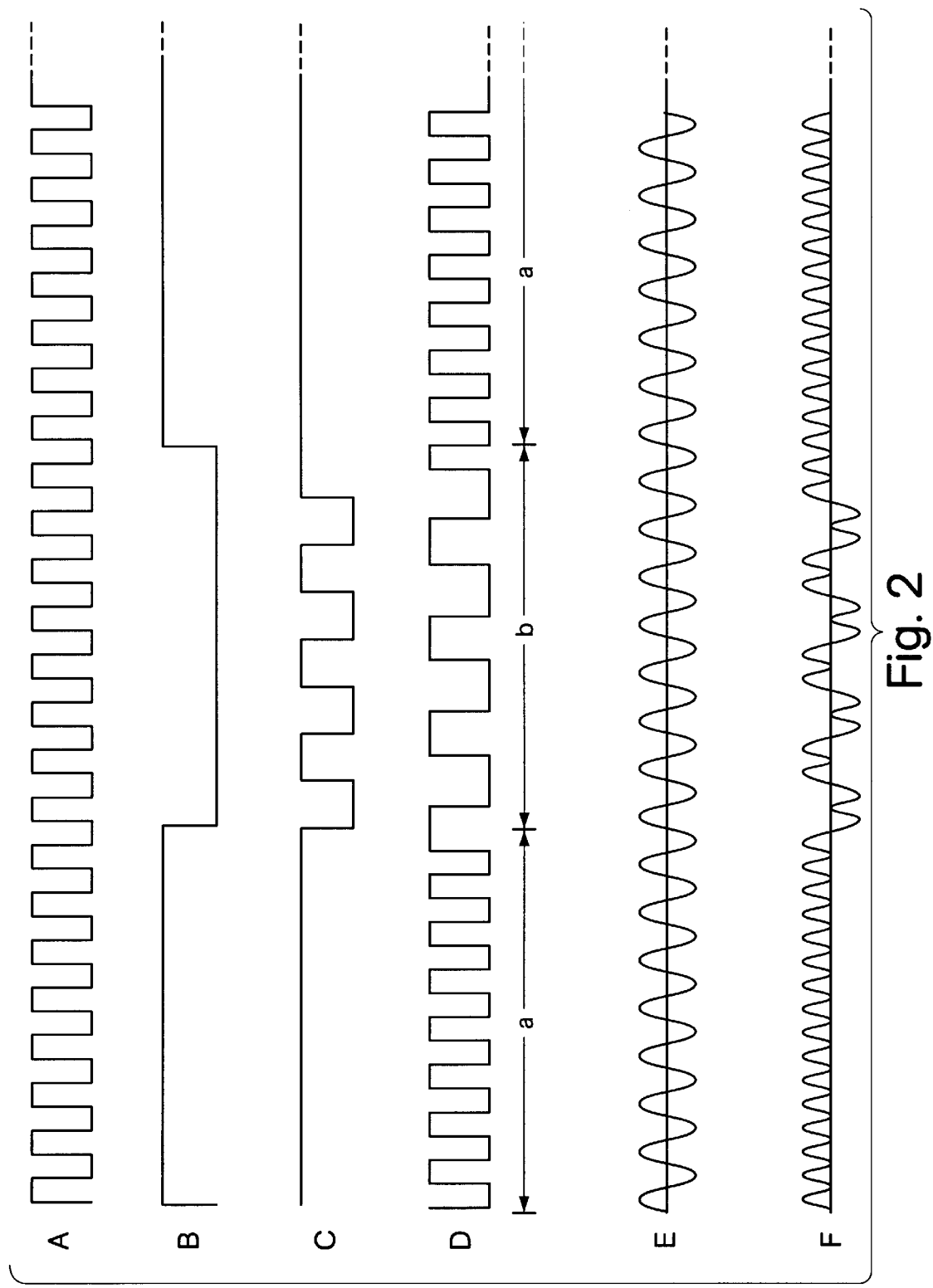
FIG. 2 are voltage and current diagrams of different signals of the circuit of FIG. 1.

FIG. 2 shows signal diagrams based on an exemplary pulse ratio of 0.5. The sensor current E is completely rectified when the signal B is high. The phase shifter 19 is here set so that the switching signal D is advanced with respect to the oscillator voltage 18 by 90° in order to provide the desired rectifying factor of 100% for capacitive quadrature sensor currents. The output current F of the demodulator therefore represents a sequence of positive current half waves.

When the signal B is low, the output current F of the demodulator consists of two positive and two negative half waves alternating with each other, because the switching signal D has half the clock frequency. As a result, the average current formed by the smoothing capacitor 12 is zero, corresponding to a rectifying factor of 0%.

Consequently, cycling between the two rectifying factors of 0% and 100% at a pulse duty cycle of 0.5 produces the desired total rectifying factor of 50%, provided that the capacitor 12 has a large enough capacitance. Since the signal B is produced digitally by the microprocessor 17, the signal B is stable and temperature-independent. Likewise, digital processing also stabilizes the set rectifying factor.

To prevent beating between the processor clock frequency and the oscillator frequency, the signal B is preferably sychronized with the oscillator 1. The digital signal A which is synchronized with the oscillator, is inputted to the input terminal 25 of the microprocessor 17. Instead of using two frequencies for switching the signal D, the switching signal D can also vary between the fundamental frequency and a continuous low or high level, which also produces a rectifying factor of 0%. This arrangement, however, causes a large amplification of the offset voltage of the operational amplifier 13. This would require a chopper-stabilized operational amplifier or a synchronized demodulator circuit without a DC current path.

A rectifying factor of 0% can also be attained if the synchronous demodulator 11 is switched with a high resistance. In this case, however, the zero-ohm impedance of the current transformer 6 collapses, causing the load for the oscillator 1 to suddenly jump.

The method of variably controlling the rectifying factor provides a significant advantage as compared to switching the slope of the current two voltage converter 13, 14, which may also solve the problem associated with overloading the A/D converter 16, in that the current compensation resistor 14 needs to compensate only the measurement currents which are reduced according to the rectifying factor. This is an important point, since the winding ratio of the transformer 2, 6 is selected so that a sufficiently large temperature-independent demodulator current F is produced even if the sensor capacitance changes only by a few pF. If the sensor capacitance is large and the rectifying factor is not reduced, the current F may reach several mA, so that the current consumption of the converter 13, 14 may make it impossible to operate the sensor in a current loop of 4 . . . 20 mA.

The method according to the invention not only consumes very little current, but also provides a stable digital operation independent of temperature and a fully automatic selection of the measurement range in small steps. In addition, the method is cost effective and the apparatus has a small footprint and a low part count.

The method of the invention advantageously evaluates the admittance of the sensor phase-selectively and with separate potentials.

Moreover, the measurement system can perform self diagnostics by performing the tests with a variable rectifying factor and can perform self-calibration. For example, the processor can readjust the zero point by reducing the total rectifying factor to 0%.

Lastly, two different pulse ratios of the control pulses (D) may be provided to variably set a rectifier value of the synchronous demodulator.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. Method for evaluating an admittance of a variable capacitance, comprising:
   supplying an oscillator voltage to the capacitance, the oscillator voltage having an oscillator frequency; and
   evaluating the admittance of the capacitance with an evaluation circuit which includes a synchronous demodulator and produces a measurement signal corresponding to the admittance of the capacitance,
   wherein the synchronous demodulator is controlled by a switching signal derived from the oscillator voltage, and the switching signal is toggled between the oscillator frequency and at least a second frequency which is different from the oscillator frequency, so as to adjust a rectifying factor of the synchronous demodulator.

2. Method according to claim 1, wherein the second frequency is a DC signal.

3. Method according to claim 2, wherein the DC signal switches the synchronous demodulator between a high impedance and a short circuit.

4. Method according to claim 1, wherein the rectifying factor of the synchronous demodulator can be selectively adjusted by selecting a frequency ratio between the oscillator frequency and the second frequency.

5. Method according to claim 1, wherein the switching signal is produced by:
   shifting a phase of the oscillator voltage,
   converting the oscillator voltage to a square wave, and
   logically combining the oscillator voltage with another signal.

6. Method according to claim 5, wherein the other signal comprises an output signal of a frequency divider, which frequency divider receives as an input signal the phase-shifted and converted square wave oscillator signal.

7. Method according to claim 1, wherein the second frequency is substantially identical to one half of the oscillator frequency.

8. Method according to claim 1, wherein the switching signal is toggled between the oscillator frequency and the second frequency according to a binary control signal supplied by a microprocessor, with the rectifying factor of the synchronous demodulator determined by a pulse duty factor of the binary control signal.

9. Method according to claim 8, wherein the pulse duty factor of the binary control signal can be adjusted.

10. Method according to claim 8, wherein the rectifying factor is adjusted so that an analog-to-digital converter connected to an output of the synchronous demodulator is modulated over a greatest possible range, without saturating the analog-to-digital converter at a greatest expected value of the capacitance.

11. System for evaluating an admittance of a variable capacitance, comprising:
    an oscillator supplying an oscillator voltage to the capacitance, the oscillator voltage having an oscillator frequency;
    a current converter having a primary winding, and a secondary winding with two terminals and a center tap, the center tap connected to a zero volt potential, the capacitance coupled to the primary winding;
    a synchronous demodulator implemented as a switch having two input terminals, with each input terminal connected to a respective one of the terminals of the secondary winding, and an output terminal, the switch controlled by a switching signal derived from the oscillator voltage and alternatingly connecting the output terminal with the two input terminals;
    an evaluation circuit connected to the output terminal of the synchronous demodulator and producing a signal corresponding to the admittance of the capacitance; and
    a microprocessor providing a control signal which switches the switching signal of the synchronous demodulator between at least two states corresponding to different rectifying factors of the synchronous demodulator.

12. System according to claim 11, further comprising:
    an XOR gate having a first input, a second input, and an output; and
    a phase shifter and a square wave generator carrying the oscillator voltage,
    wherein a first signal corresponding to the oscillator voltage is supplied to the first input of the XOR gate and a second signal formed from the first signal by frequency division is supplied to the second input of the XOR gate, and the output of the XOR gate supplies the switching signal.

13. System according to claim 12, wherein the phase shifter is adjusted so as to advance a phase of the output signal with respect to the oscillator voltage by 90°.

14. System according to claim 11, wherein the control signal is synchronized with the oscillator voltage.

15. System according to claim 11, further comprising a current-to-voltage converter and an analog-to-digital converter connected in series, wherein an output of the synchronous demodulator is connected to one of the current-to-voltage converter and the analog-to-digital converter.

16. System according to claim 15, wherein the output of the analog-to-digital converter is connected to an input of the microprocessor.

17. System according to claim 11, wherein the oscillator voltage is supplied to an input of the microprocessor.

18. System according to claim 17, wherein the oscillator voltage is at least one of phase-shifted and converted to a square wave.

19. System according to claim 11, wherein in one of the at least two states the switching signal has a switching frequency equal to the oscillator frequency and in another of the at least two states the switching signal has a switching frequency equal to an even integer fraction of the oscillator frequency.

* * * * *